United States Patent
Islam et al.

(10) Patent No.: US 11,611,971 B2
(45) Date of Patent: Mar. 21, 2023

(54) SECONDARY CELL BEAM FAILURE DETECTION EVALUATION PERIOD DURING INTER-BAND CARRIER AGGREGATION

(71) Applicant: QUALCOMM Incorporated, San Diego, CA (US)

(72) Inventors: Muhammad Nazmul Islam, Littleton, MA (US); Valentin Alexandru Gheorghiu, Yokohama (JP); Awlok Singh Josan, San Francisco, CA (US); Junyi Li, Franklin Park, NJ (US); Changhwan Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 17/301,536

(22) Filed: Apr. 6, 2021

(65) Prior Publication Data
US 2021/0321420 A1    Oct. 14, 2021

Related U.S. Application Data

(60) Provisional application No. 63/008,375, filed on Apr. 10, 2020.

(51) Int. Cl.
| | | |
|---|---|---|
| *H04W 72/08* | (2009.01) | |
| *H04L 5/00* | (2006.01) | |
| *H04W 72/10* | (2009.01) | |
| *H04W 72/044* | (2023.01) | |

(52) U.S. Cl.
CPC ......... *H04W 72/085* (2013.01); *H04L 5/0032* (2013.01); *H04W 72/044* (2013.01); *H04W 72/10* (2013.01)

(58) Field of Classification Search
CPC . H04W 72/044; H04W 72/085; H04W 72/10; H04L 5/0032; H04B 7/0695
See application file for complete search history.

(56) References Cited

U.S. PATENT DOCUMENTS

| | | | | |
|---|---|---|---|---|
| 11,368,206 B2 * | 6/2022 | Chen | ..................... | H04W 76/19 |
| 2021/0144049 A1 * | 5/2021 | Lin | ..................... | H04B 7/0695 |
| 2021/0159967 A1 * | 5/2021 | Cirik | ..................... | H04L 5/0098 |
| 2021/0385896 A1 * | 12/2021 | Kim | .................. | H04W 36/0027 |
| 2022/0131591 A1 * | 4/2022 | Huang | .................. | H04W 16/28 |

\* cited by examiner

*Primary Examiner* — Siu M Lee
(74) *Attorney, Agent, or Firm* — Harrity & Harrity, LLP

(57) ABSTRACT

Various aspects of the present disclosure generally relate to wireless communication. In some aspects, a user equipment (UE) may determine a scaling factor for a beam failure detection (BFD) evaluation period associated with a secondary cell group of a set of secondary cell groups. The scaling factor may be determined based at least in part on a number of secondary cell groups included in the set of secondary cell groups. In some aspects, the UE may perform a BFD measurement, associated with the secondary cell group, based at least in part on the scaling factor for the BFD evaluation period. Numerous other aspects are provided.

29 Claims, 7 Drawing Sheets

| Scenario | Scaling factor for FR1 PSCC | Scaling factor for an FR1 SCC | Scaling factor for FR2 PSCC | Scaling factor for an FR2 SCC |
|---|---|---|---|---|
| EN-DC with FR1 only CA | 1 | No. of configured/ activated FR1 Scell groups | N/A | N/A |
| EN-DC with FR2 only intra-band CA | N/A | N/A | 1 | No. of configured/ activated FR2 Scell groups |
| EN-DC with FR1+FR2 CA (FR1 PScell) | 1 | No. of configured/ activated FR1+FR2 Scell groups | N/A | No. of configured/ activated FR1+FR2 Scell groups |
| EN-DC with FR1+FR2 CA (FR2 PScell) | N/A | No. of configured/ activated FR1+FR2 Scell groups | 1 | No. of configured/ activated FR1+FR2 Scell groups |

FIG. 3B

| Scenario | Scaling factor for FR1 PSCC | Scaling factor for an FR1 SCC | Scaling factor for FR2 PSCC | Scaling factor for an FR2 SCC |
|---|---|---|---|---|
| EN-DC with FR1+FR2 CA (FR1 PScell) | 1 | β × No. of configured/activated FR1+FR2 Scell groups | N/A | α × No. of configured/activated FR1+FR2 Scell groups |
| EN-DC with FR1+FR2 CA (FR2 PScell) | N/A | β × No. of configured/activated FR1+FR2 Scell groups | 1 | α × No. of configured/activated FR1+FR2 Scell groups |

FIG. 3C

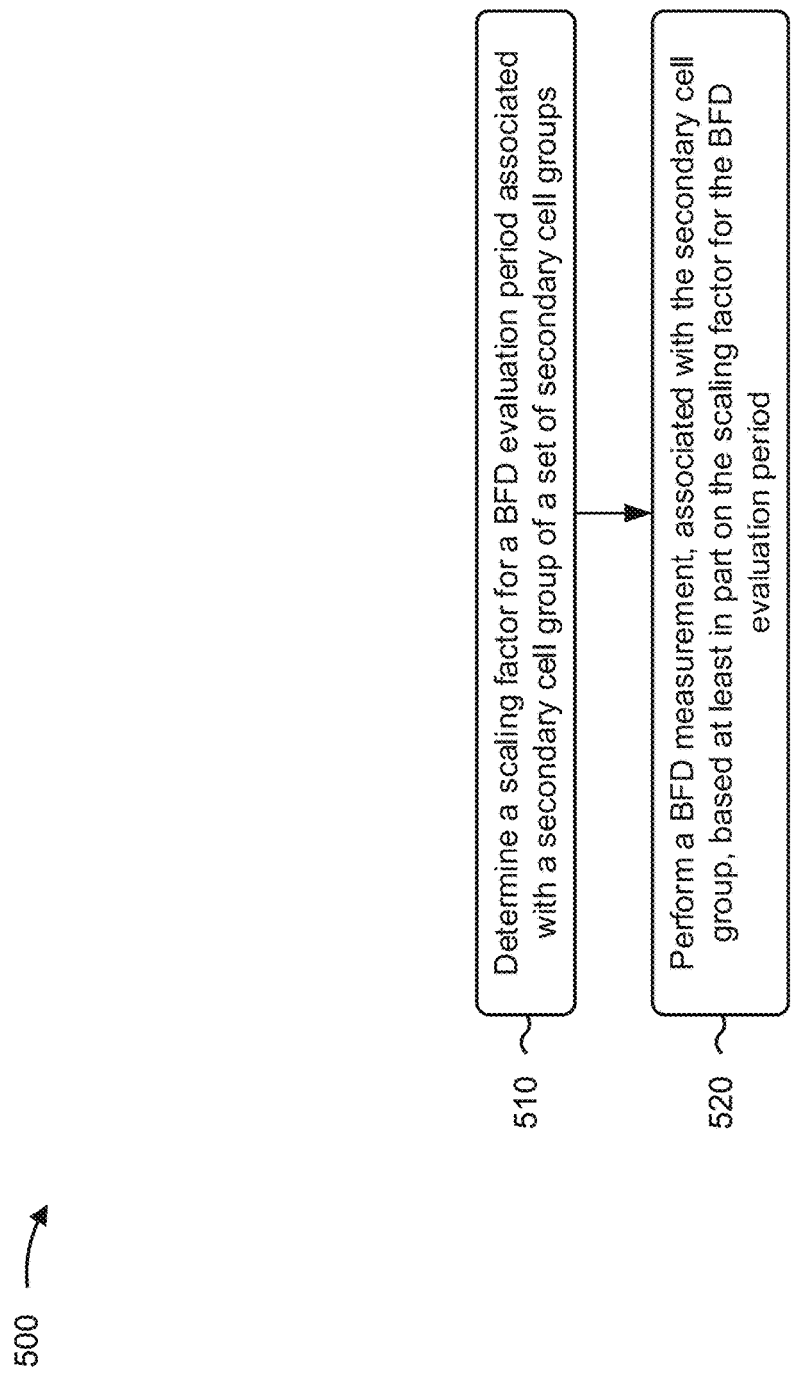

SECONDARY CELL BEAM FAILURE DETECTION EVALUATION PERIOD DURING INTER-BAND CARRIER AGGREGATION

CROSS-REFERENCE TO RELATED APPLICATION

This Patent application claims priority to Provisional Patent Application No. 63/008,375, filed on Apr. 10, 2020, entitled "SECONDARY CELL BEAM FAILURE DETECTION EVALUATION PERIOD DURING INTER-BAND CARRIER AGGREGATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for secondary cell beam failure detection (BFD) evaluation period during inter-band carrier aggregation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include generating a set of secondary cell groups associated with a plurality of secondary cells, the plurality of secondary cells including a set of inter-band secondary cells, the set of inter-band secondary cells being included in a first secondary cell group of the set of secondary cell groups; and performing a beam failure detection (BFD) measurement associated with a secondary cell group of the set of secondary cell groups.

In some aspects, a method of wireless communication, performed by a UE, may include determining a scaling factor for a BFD evaluation period associated with a secondary cell group of a set of secondary cell groups, the scaling factor being determined based at least in part on a number of secondary cell groups included in the set of secondary cell groups; and performing a BFD measurement, associated with the secondary cell group, based at least in part on the scaling factor for the BFD evaluation period.

In some aspects, a UE for wireless communication may include a memory and one or more processors coupled to the memory. The one or more processors may be configured to generate a set of secondary cell groups associated with a plurality of secondary cells, the plurality of secondary cells including a set of inter-band secondary cells, the set of inter-band secondary cells being included in a first secondary cell group of the set of secondary cell groups; and perform a BFD measurement associated with a secondary cell group of the set of secondary cell groups.

In some aspects, a UE for wireless communication may include a memory and one or more processors coupled to the memory. The one or more processors may be configured to determine a scaling factor for a BFD evaluation period associated with a secondary cell group of a set of secondary cell groups, the scaling factor being determined based at least in part on a number of secondary cell groups included in the set of secondary cell groups; and perform a BFD measurement, associated with the secondary cell group, based at least in part on the scaling factor for the BFD evaluation period.

In some aspects, a non-transitory computer-readable medium may store one or more instructions for wireless communication. The one or more instructions, when executed by one or more processors of a UE, may cause the one or more processors to generate a set of secondary cell groups associated with a plurality of secondary cells, the plurality of secondary cells including a set of inter-band secondary cells, the set of inter-band secondary cells being included in a first secondary cell group of the set of secondary cell groups; and perform a BFD measurement associated with a secondary cell group of the set of secondary cell groups.

In some aspects, a non-transitory computer-readable medium may store one or more instructions for wireless communication. The one or more instructions, when executed by one or more processors of a UE, may cause the one or more processors to determine a scaling factor for a BFD evaluation period associated with a secondary cell group of a set of secondary cell groups, the scaling factor being determined based at least in part on a number of secondary cell groups included in the set of secondary cell groups; and perform a BFD measurement, associated with the secondary cell group, based at least in part on the scaling factor for the BFD evaluation period.

In some aspects, an apparatus for wireless communication may include means for generating a set of secondary cell groups associated with a plurality of secondary cells, the plurality of secondary cells including a set of inter-band secondary cells, the set of inter-band secondary cells being included in a first secondary cell group of the set of secondary cell groups; and means for performing a BFD measurement associated with a secondary cell group of the set of secondary cell groups.

In some aspects, an apparatus for wireless communication may include means for determining a scaling factor for a BFD evaluation period associated with a secondary cell group of a set of secondary cell groups, the scaling factor being determined based at least in part on a number of secondary cell groups included in the set of secondary cell groups; and means for performing a BFD measurement, associated with the secondary cell group, based at least in part on the scaling factor for the BFD evaluation period.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples associated with a secondary cell beam failure detection (BFD) evaluation period during inter-band carrier aggregation, in accordance with the present disclosure.

FIG. 5 is a diagram illustrating an example process performed, for example, by a user equipment, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
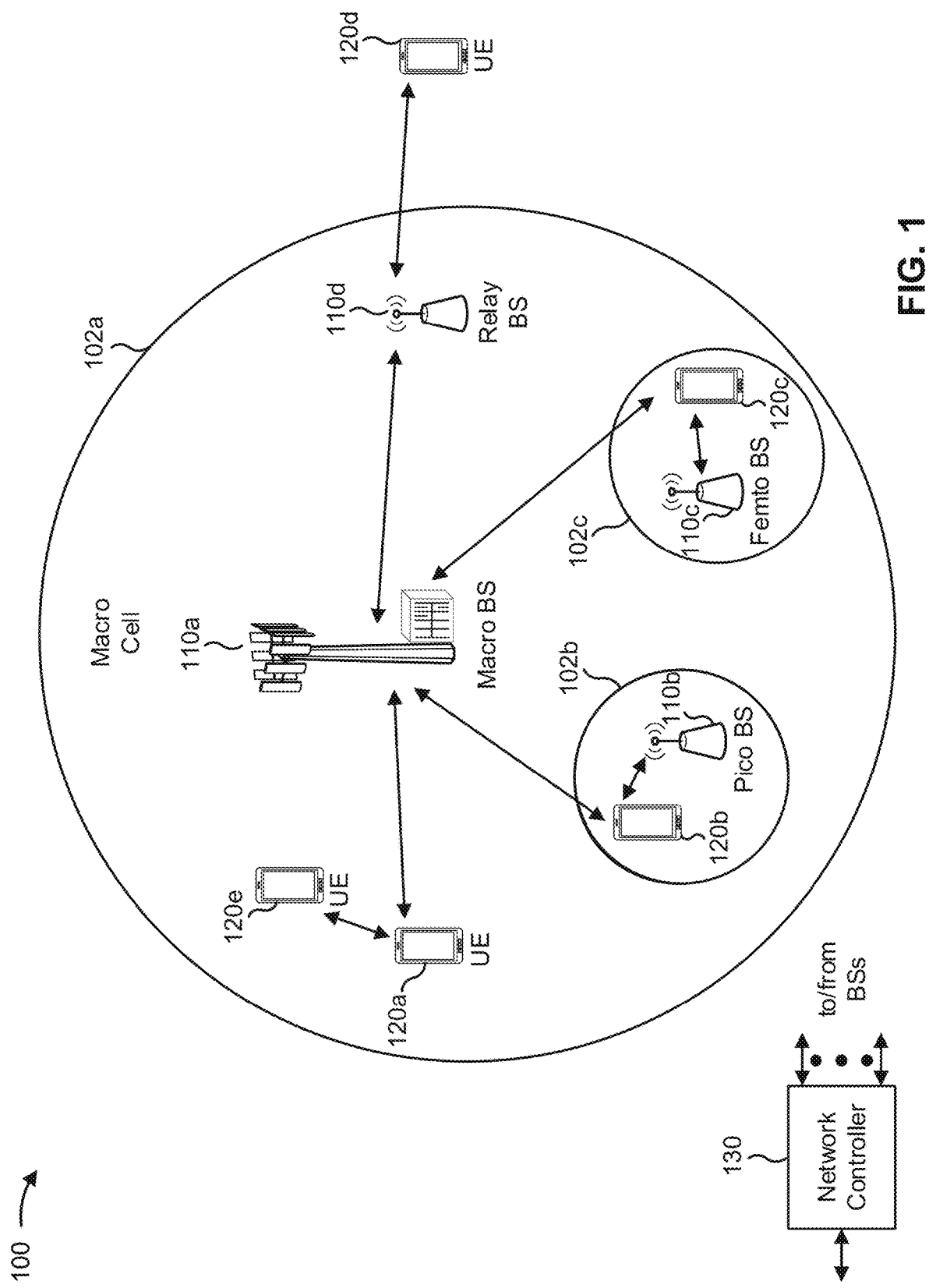
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
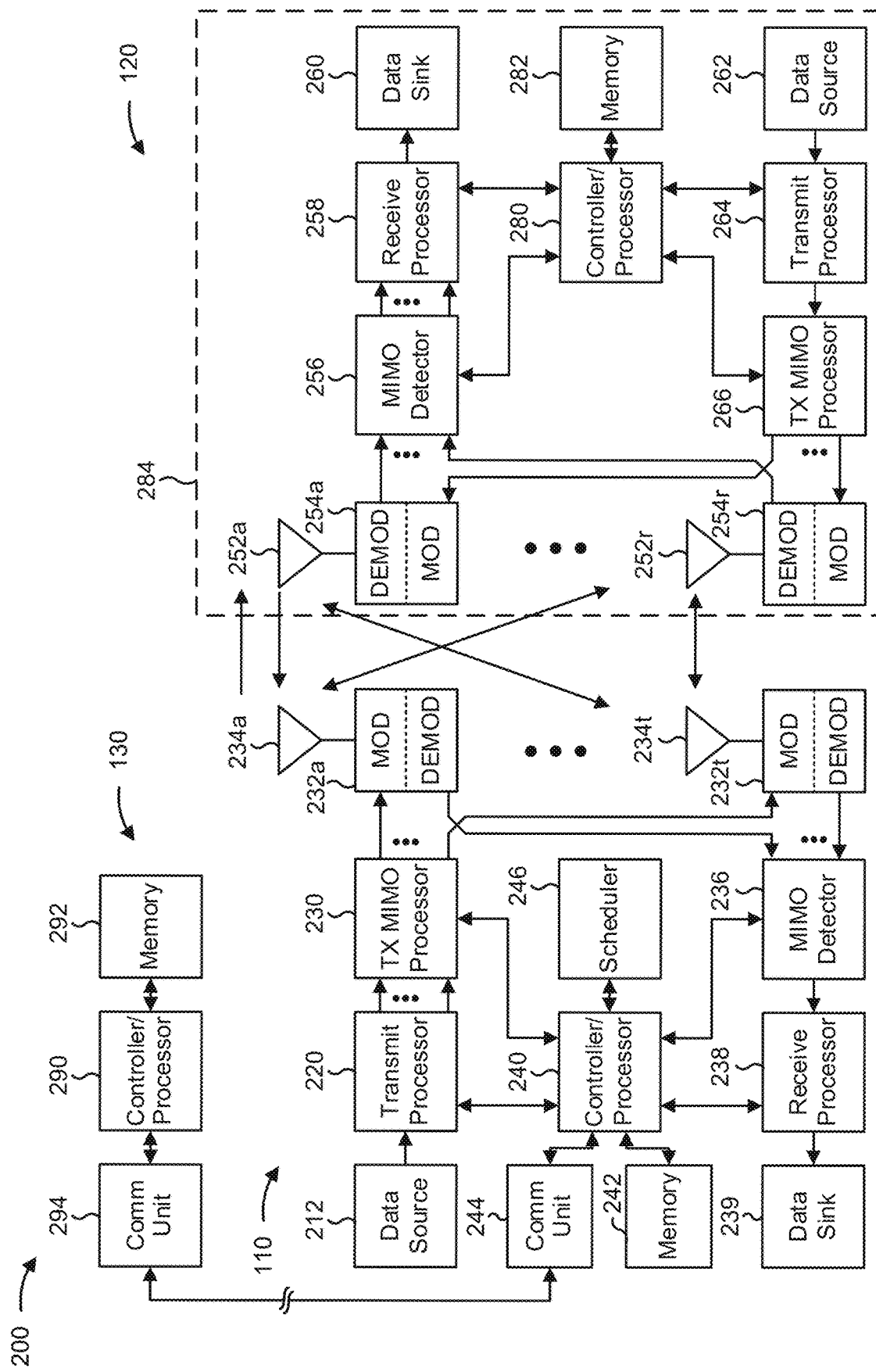
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIG. 3A-3C, 4, or 5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIG. 3A-3C, 4, or 5.

Controller/processor 240 of base station 110, controller/processor 280 of UE 120, and/or any other component(s) of FIG. 2 may perform one or more techniques associated with a secondary cell BFD evaluation period during inter-band carrier aggregation, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, UE 120 may include means for generating a set of secondary cell groups associated with a plurality of secondary cells, the plurality of secondary cells including a set of inter-band secondary cells, the set of inter-band secondary cells being included in a first secondary cell group of the set of secondary cell groups; means for performing a BFD measurement associated with a secondary cell group of the set of secondary cell groups; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for determining a scaling factor for a BFD evaluation period associated with a secondary cell group of a set of secondary cell groups, the scaling factor being determined based at least in part on a number of secondary cell groups included in the set of secondary cell groups; means for performing a BFD measurement, associated with the secondary cell group, based at least in part on the scaling factor for the BFD evaluation period; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Carrier aggregation (CA) enables two or more component carriers to be used by a UE (e.g., a UE 120) to form a combined channel (e.g., to improve throughput) for communicating with a base station (e.g., a base station 110). Intra-band CA is a scenario in which component carriers used for CA are in the same frequency band, while inter-band CA is a scenario in which component carriers used for CA are in different frequency bands. Additionally, component carriers used for CA may be contiguous or non-contiguous.

Similar to CA, dual connectivity (DC) aims to utilize radio resources within multiple carriers. DC can be used to increase throughput, provide mobility robustness, support load-balancing among network nodes, and/or the like. A DC mode of operation is a mode in which a UE (e.g., in radio resource control (RRC) connected mode) is configured to utilize radio resources of two distinct schedulers located in two network nodes (e.g., two base stations 110). These network nodes are referred to as a master node (MN) and a secondary node (SN). Thus, DC enables a UE to simultaneously transmit and receive data on multiple component carriers from groups of cells via the MN and the SN. In the context of DC, a group of serving cells associated with the MN can include a primary cell (Pcell) and can optionally include one or more secondary cells (Scells). Further, a group of serving cells associated with the SN can include a primary secondary cell (PScell) and optionally one or more Scells. A particular example of DC is Evolved-UMTS Terrestrial Radio Access Network (E-UTRAN) NR-DC, which is referred to as EN-DC. EN-DC allows a UE to connect to an LTE base station (e.g., that acts as a MN) and an NR base station (e.g., that acts as an SN).

In some deployments, a UE may be configured to use CA while operating in in DC mode. For example, a UE may be configured for EN-DC with frequency range 1 (FR1) only CA. As another example, a UE may be configured for EN-DC with frequency range 2 (FR2) only intra-band CA. As another example, a UE may be configured for EN-DC with FR1 and FR2 CA where the PScell is in FR1. As another example, a UE may be configured for EN-DC with FR1 and FR2 CA where the PScell is in FR2.

In operation, a UE (e.g., a UE configured for EN-DC) may need to perform a beam failure detection (BFD) measurement associated with a given cell (e.g., such that the UE can detect a beam failure associated with the cell). For example, the UE may measure a characteristic (e.g., an RSRP) of a BFD reference signal (BFD-RS) (e.g., a synchronization signal block (SSB), a channel state information reference signal (CSI-RS)) on a beam associated with the cell. Here, if the characteristic fails to satisfy a threshold (e.g., if the RSRP is lower than a particular value), then the UE identifies a beam failure instance. The UE detects a beam failure when the number of beam failure instances reaches a configured threshold within a particular period of time (e.g., before a configured timer expires). After the beam failure is detected, the UE may perform a beam failure recovery procedure, which includes initiating a random access procedure and selecting a suitable beam to perform beam failure recovery. Upon completion of the random access procedure, beam failure recovery is considered complete.

The concept of co-located cells is important in the context of BFD. A first reference signal can be said to be quasi co-located (QCLed) with a second reference signal if a UE can derive properties associated with a QCL type (e.g., Type A, Type B, Type C, or Type D) of the second reference signal based on estimating those properties for the first reference signal. Quasi co-location types corresponding to each reference signal are given by a higher layer parameter (e.g., qcl-Type in QCL-Info). The properties associated with QCL Type A include Doppler shift, Doppler spread, average delay, and delay spread. The properties associated with QCL Type B include Doppler shift and Doppler spread. The properties associated with QCL Type C include Doppler shift and average delay. The properties associated with QCL Type D include a spatial Rx parameter.

When multiple FR1 inter-band secondary cells are co-located (e.g., QCLed), a BFD in one of the FR1 inter-band secondary cells allows the UE to estimate a beam quality of the other FR1 inter-band secondary cells. Notably, this relationship of QCLed cells may not necessarily hold in FR2. However, when multiple FR2 inter-band secondary cells are close in frequency and similar beams are used to transmit the BFD-RS, a BFD in one of the multiple FR2 inter-band secondary cells may allow the UE to estimate beam quality of the other FR2 inter-band secondary cells. Thus, the UE may not need to evaluate beams of QCLed secondary cells, as frequently as non-QCLed secondary cells.

A UE configured for CA (e.g., an EN-DC UE configured for CA) may be capable of simultaneously performing up two BFD measurements at a given BFD evaluation period. A BFD measurement should be performed for a primary cell/primary secondary cell at each BFD evaluation period (e.g., to ensure acceptable operation on the anchor band). Thus, at a given BFD evaluation period, the UE can perform a BFD measurement for only one of the secondary cells. This means that BFD evaluation periods needs to somehow be shared or scaled for use in performing BFD measurements associated with the secondary cells.

Some aspects described herein provide techniques and apparatuses associated with a secondary cell BFD evaluation period during inter-band CA.

In some aspects, a UE may generate a set of secondary cell groups associated with a plurality of secondary cells. In some aspects, the plurality of secondary cells may include a set of inter-band secondary cells, the set of inter-band secondary cells being included in a first secondary cell group of the set of secondary cell groups. In some aspects, the UE may perform a BFD measurement associated with a secondary cell group of the set of secondary cell groups. In some aspects, the UE may determine a scaling factor for a BFD evaluation period associated with the secondary cell group, and may perform the BFD measurement associated with the secondary cell group based at least in part on the scaling factor for the BFD evaluation period. In some aspects, the UE may determine the scaling factor based at least in part on a number of secondary cell groups included in the set of secondary cell groups. Additional details are described below.

Figure 3A:
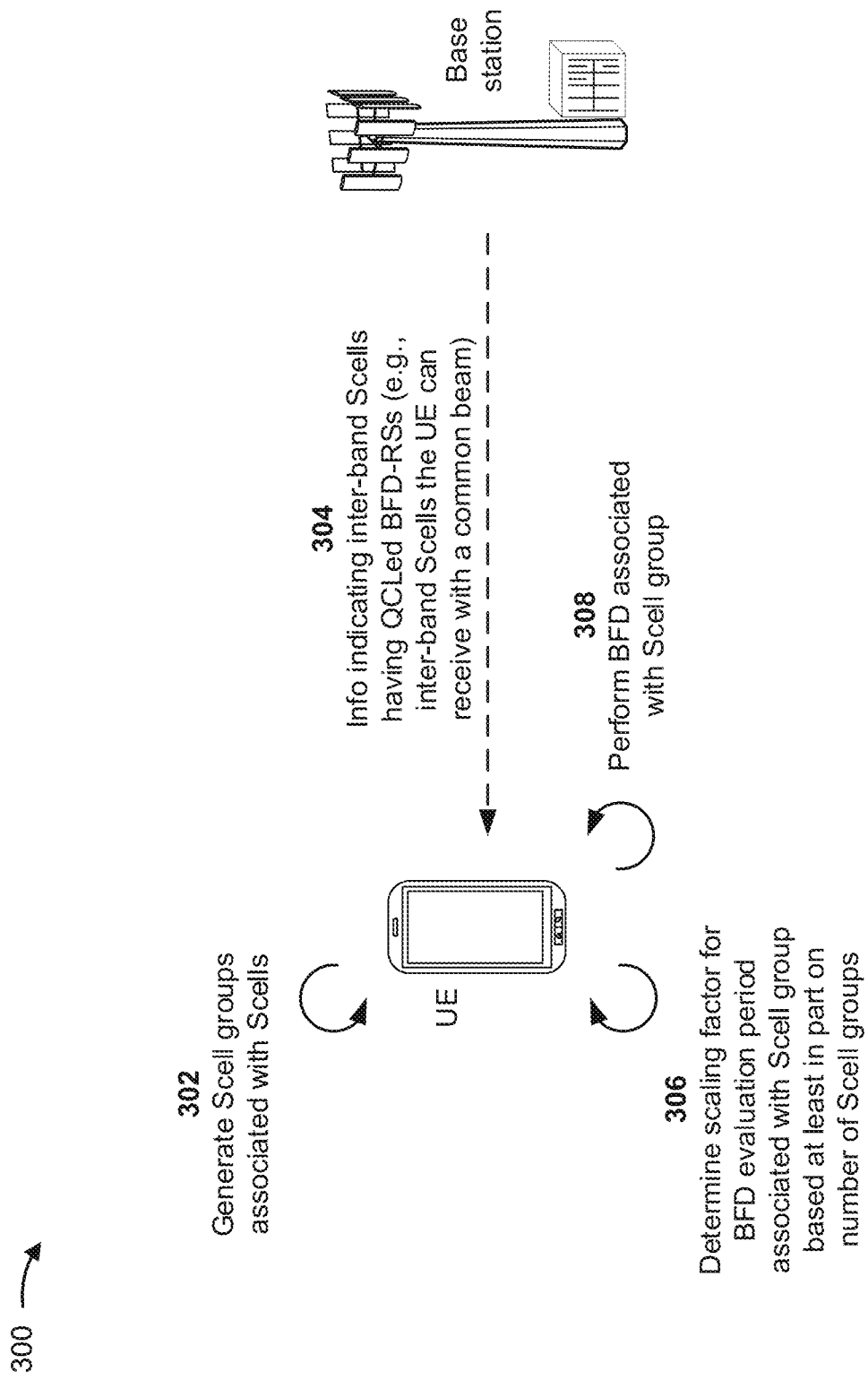

FIGS. 3A-3C are diagram illustrating examples associated with a secondary cell BFD evaluation period during inter-band carrier aggregation, in accordance with the present disclosure.

In example 300 shown in FIG. 3A, a UE (e.g., a UE 120) is configured for EN-DC operation with inter-band CA, where the UE is associated with a plurality of secondary cells. In some aspects, the plurality of secondary cells includes one or more activated secondary cells. In some aspects, the plurality of secondary cells includes one or more configured secondary cells (e.g., secondary cells that are configured but not activated).

As shown by reference 302 in FIG. 3A, the UE may generate a set of secondary cell groups associated with the plurality of secondary cells. In some aspects, one or more of the plurality of inter-band secondary cells may be included in a given secondary cell group of the set of secondary cell groups generated by the UE.

For example, in some aspects, the UE may identify two or more inter-band secondary cells as having QCLed BFD reference signals (e.g., two more inter-band secondary cells that the UE can receive with a common beam). Here, the UE may generate a secondary cell group that includes the two or more inter-band secondary cells having QCLed BFD reference signals. In some aspects, as indicated by reference 304, the UE may identify the two or more inter-band secondary cells as having QCLed BFD reference signals based at least in part on information received (e.g., from base station 110) via RRC signaling, system information, a medium access control control element (MAC-CE), downlink control information (DCI), or the like. Notably, in some scenarios in which the network does not configure which secondary cell are co-located/QCLed, the number of secondary cell groups may match the number of secondary cells (e.g., each secondary cell may be included in its own secondary cell group such that each secondary cell group includes on secondary cell). Here, a scaling factor for a BFD evaluation period (described in further detail below) may be proportional to the number of secondary cells. Alternatively, in some aspects, the UE may identify the two or more inter-band secondary cells as having QCLed BFD reference signals based at least in part on a configuration of the UE. Alternatively, in some aspects, the UE may identify the two or more inter-band secondary cells as having QCLed BFD reference signals based at least in part on information associated with the set of inter-band secondary cells (e.g., information associated with receive beams used by the at least two inter-band secondary cells). In some aspects, the UE may identify the two or more inter-band secondary cells as having QCLed BFD reference signals according to a UE implementation.

As another example, in some aspects, the UE may identify at least two secondary cells, of the plurality of secondary cells, as sharing a same reference signal as a BFD reference signal. Here, the UE may generate a secondary cell group that includes the at least two inter-band secondary cells that share the same reference signal as a BFD reference signal. Thus, if a reference signal is located in a secondary cell and is implicitly configured as a BFD reference several secondary cells, the UE can assign these secondary cells to the same secondary cell group.

In some aspects, the set of secondary cell groups may include one or more secondary cell groups. In some aspects, a given secondary cell group of the set of secondary cell groups may include two or more secondary cells (e.g., two or more secondary cells having QCLed BFD reference signals, two or more that share a same reference signal as a BFD reference signal, or the like). Additionally, in some aspects, a given secondary cell group of the set of secondary cell groups may include a single secondary cell (e.g., when the secondary cell does not have a QCLed BFD reference signal with any other secondary cell of the plurality of secondary cells, when the secondary cell does not share a same reference signal as a BFD reference signal with any other secondary cell of the plurality of secondary cells, or the like). In some aspects, the set of secondary cell groups includes a set of activated secondary cell groups. In some aspects, the set of secondary cell groups includes a set of configured secondary cell groups (e.g., when one or more of the plurality of secondary cells are configured but not activated).

As shown by reference 306, in some aspects, the UE may determine a scaling factor for a BFD evaluation period associated with a secondary cell group of the set of secondary cell groups. The scaling factor is a value indicating how often the UE is to perform a BFD for a secondary cell group included in the secondary cell group. For example, a scaling factor of 2 indicates that the UE is to perform a BFD measurement once in every two BFD evaluation periods. As another example, a scaling factor of 8/3 indicates that the UE is to perform BFD measurement three times in every eight BFD evaluation periods.

In some aspects, the UE may determine the scaling factor based at least in part on a number of secondary cell groups included in the set of secondary cell groups. For example, when the set of secondary cell groups includes two secondary cell groups the UE may determine that a scaling factor for both of the secondary cell groups is equal to 2 (e.g., the scaling factor may correspond to the number of secondary cell groups included in the set of secondary cell groups).

FIG. 3B illustrates an example table associated with determining the scaling factors in a variety of scenarios for EN-DC with CA. As shown in the second row of the table in FIG. 3B, in a scenario in which a UE is configured for EN-DC with FR1 only CA, a scaling factor for a given FR1 secondary cell may be equal to the number of FR1 secondary cell groups, and a scaling factor for the FR1 primary secondary cell may be equal to 1. As shown in the third row, in a scenario in which a UE is configured for EN-DC with FR2 only intra-band CA, a scaling factor for a given FR2 secondary cell may be equal to the number of FR2 secondary cell groups, and a scaling factor for the FR2 primary secondary cell may be equal to 1. As shown in the fourth row, in a scenario in which a UE is configured for EN-DC with FR1+FR2 CA where the primary secondary cell is in FR1, a scaling factor for a given FR1 secondary cell or FR2 secondary cell may be equal to the number of FR1 secondary cell groups plus the number of FR2 secondary cell groups, and a scaling factor for the FR1 primary secondary cell may be equal to 1. As shown in the fifth row, in a scenario in which a UE is configured for EN-DC with FR1+FR2 CA where the primary secondary cell is in FR2, a scaling factor for a given FR1 secondary cell or FR2 secondary cell may be equal to the number of FR1 secondary cell groups plus the number of FR2 secondary cell groups, and a scaling factor for the FR2 primary secondary cell may be equal to 1.

In some aspects, the UE may determine and apply an intra-secondary cell group scaling factor modification. The intra-secondary cell group scaling factor modification is associated with modification of the scaling factor as related to different secondary cells within a secondary cell group. In some aspects, intra-secondary cell group scaling factor modifications may be used to cause the UE to measure each secondary cell within a given secondary cell group with some periodicity. For example, a first secondary cell group may include a first secondary cell and a second secondary cell. Further, a second secondary cell group may include a third secondary cell. In this example, the scaling factor for the first and second secondary cell groups is 2 (e.g., since there are two secondary cell groups). Here, the base station may configure an intra-secondary cell group scaling factor modification for the first secondary cell as 4/3, and may configure an intra-secondary cell group scaling factor modification for the second secondary cell as 4. The UE can apply the intra-secondary cell group scaling factor modifications to the scaling factor, meaning that the scaling factor for the first secondary cell is equal to 8/3 (e.g., 2×4/3=8/3) and the scaling factor for the second secondary cell is equal to 8 (e.g., 2×4=8). Here, the scaling factor for the third secondary cell is 2 (e.g., no modification was applied since the third secondary cell is the only secondary cell in the second secondary cell group). In this case, the UE may perform a BFD measurement on the first secondary cell three times in every eight BFD evaluation periods, on the second secondary cell one time in every eight BFD evaluation periods, and on the third secondary cell four times in every eight BFD evaluation periods In some aspects, the UE may determine an intra-secondary cell group scaling factor modification based at least in part on information received via RRC signaling, system information, a MAC-CE, DCI, or the like. Additionally, in some aspects, the UE may determine an intra-secondary cell group scaling factor modification based at least in part on a configuration of the UE. Additionally, in some aspects, the UE may determine an intra-secondary cell group scaling factor modification based at least in part on information associated with the set of inter-band secondary cells.

In some aspects, the UE may determine and apply a frequency range scaling factor modification. The frequency range scaling factor modification is associated with modification of the scaling factor as related to different frequency ranges in a CA scenario. For example, the scaling factors indicated in the table in FIG. 3B give the same priority to a BFD evaluation period for a given secondary cell during FR1+FR2 CA regardless of whether the given secondary cell is in FR1 or FR2. However, in some cases, an FR2 secondary cell may need to be evaluated more frequently than an FR1 secondary cell (e.g., since beams are more likely to change in the FR2 secondary cell). In some other cases, a FR1 secondary cell may need to be evaluated more frequently than an FR2 secondary cell (e.g., since the FR2 secondary cell may be needed only to increase throughput and the FR1 secondary cell may be needed to maintain a link, the FR1 secondary cell may be considered to be more important in some scenarios). Hence, a frequency range scaling factor modification can be used to prioritize BFD evaluation periods on the basis of frequency range, as needed.

For example, a secondary cell group may include an FR1 secondary cell and an FR2 secondary cell, and may have a scaling factor of 2. Without modification, the scaling factor the UE would alternate between perform BFD measurements for these two secondary cell. Here, the base station may configure a frequency range scaling factor modification for FR1 as 4, and may configure a frequency range scaling factor modification for FR2 as 4/3. The UE can apply the frequency range scaling factor modifications to the scaling factor, meaning that the scaling factor for the FR1 secondary cell is equal to 8 (e.g., 2×4=8) and the scaling factor for the FR2 secondary cell is equal to 8/3 (e.g., 2×4/3=8/3). In this case, the UE may perform a BFD measurement on the FR1 secondary cell one time in every eight BFD evaluation periods and on the FR2 secondary cell three times in every eight BFD evaluation periods.

FIG. 3C illustrates an example table associated with determining frequency range scaling factor modifications in a variety of scenarios for EN-DC with FR1+FR2 CA. As shown in the second and third rows of the table in FIG. 3C, in scenarios in which a UE is configured for EN-DC with FR1+FR2 CA (e.g., where the primary secondary cell is in FR1 or where the primary secondary cell is in FR2), a frequency range scaling factor modification β may be applied to the scaling factor for a given FR1 secondary cell. As further shown, a frequency range scaling factor modification α may be applied to the scaling factor for a given FR2 secondary cell.

In some aspects, as indicated in the above examples, the frequency range scaling factor modification can be for inter-band secondary cells included in FR1 or can be for inter-band secondary cells included in FR2.

In some aspects, the UE may determine a frequency range scaling factor modification based at least in part on information received via RRC signaling, system information, a MAC-CE, DCI, or the like. Additionally, in some aspects, the UE may determine a frequency range scaling factor modification based at least in part on a configuration of the UE. Additionally, in some aspects, the UE may determine a frequency range scaling factor modification based at least in part on a frequency range of the inter-band secondary cell.

In some aspects, the UE may determine a frequency range scaling factor modification associated with an inter-band secondary cell is determined based at least in part on a priority of a frequency range of the inter-band secondary cell. In some aspects, the priority may indicate relative importance of a frequency range (e.g., high priority, low priority, or the like).

For example, in some aspects, the UE may determine the priority of the frequency range based at least in part on whether the frequency range of the inter-band secondary cell matches a frequency range of a primary cell. Here, the UE may determine that the priority of the frequency range is a high priority when the frequency range of the inter-band secondary cell matches the frequency range of the primary cell. Conversely, the UE may determine that the priority of the frequency range is a low priority when the frequency range of the inter-band secondary cell does not match the frequency range of the primary cell.

As another example, in some aspects, the UE may determine the priority of the frequency range based at least in part on whether the frequency range of the inter-band secondary cell matches a frequency range of a physical uplink control channel (PUCCH) cell component carrier. Here, the UE may determine that the priority of the frequency range is a high priority when the frequency range of the inter-band secondary cell matches the frequency range of the PUCCH cell component carrier. Conversely, the UE may determine that the priority of the frequency range is a low priority when the frequency range of the inter-band secondary cell does not match the frequency range of the PUCCH cell component carrier.

As another example, in some aspects, the UE may determine the priority of the frequency range based at least in part on comparing a number of control resource set (CORESET) transmission configuration indicator (TCI) states per component carrier for the frequency range and a number of CORESET TCI states per component carrier for another frequency range. Here, the UE may determine that the priority of the frequency range is a high priority when the number of CORESET TCI states per component carrier for the frequency range is less than or equal to the number of CORESET TCI states per component carrier for the other frequency range. Conversely, the UE may determine that the priority of the frequency range is a low priority when the number of CORESET TCI states per component carrier for the frequency range is greater than the number of CORESET TCI states per component carrier for the other frequency range.

Returning to FIG. 3A, as shown by reference 308, the UE may perform a BFD measurement associated with a secondary cell group of the set of secondary cell groups. The secondary cell group for which the BFD measurement is performed may also be referred to as a group of common beam management SCells (e.g., a group of Scells that the UE can receive). In some aspects, the UE may perform the BFD measurement based at least in part on the scaling factor for the BFD evaluation period. In some aspects, the UE may perform the BFD measurement based at least in part on an intra-secondary cell group scaling factor modification (e.g., based at least in part on applying the intra-secondary cell group scaling factor modification to the scaling factor). In some aspects, the UE may perform the BFD measurement based at least in part on a frequency range scaling factor (e.g., based at least in part on applying the frequency range scaling factor modification to the scaling factor).

In some aspects, when the secondary cell group includes two or more inter-band secondary cells having quasi co-located BFD reference signals (e.g., two more inter-band secondary cells that the UE can receive with a common beam), the UE may perform the BFD measurement one of the inter-band secondary cells included in the secondary cell group. For example, when the secondary cell group includes a first secondary cell and a second secondary cell that have quasi co-located BFD reference signals (e.g., a first secondary cell and a second secondary cell that the UE can receive with a common beam), the UE may perform the BFD measurement on the first secondary cell or on the second secondary cell. In some aspects, the UE may not evaluate BFD for other inter-band secondary cells included in the secondary cell group. Alternatively, in some aspects, the UE may perform BFD measurements on both the first and second secondary cells (e.g., during different BFD evaluation periods) according to an intra-secondary cell group scaling factor modification and/or a frequency range scaling factor modification, as described above. In some aspects, when the secondary cell group includes a single secondary cell, the UE may perform the BFD measurement the secondary cell.

As indicated above, FIGS. 3A-3C are provided as examples. Other examples may differ from what is described with respect to FIGS. 3A-3C.

Figure 4:
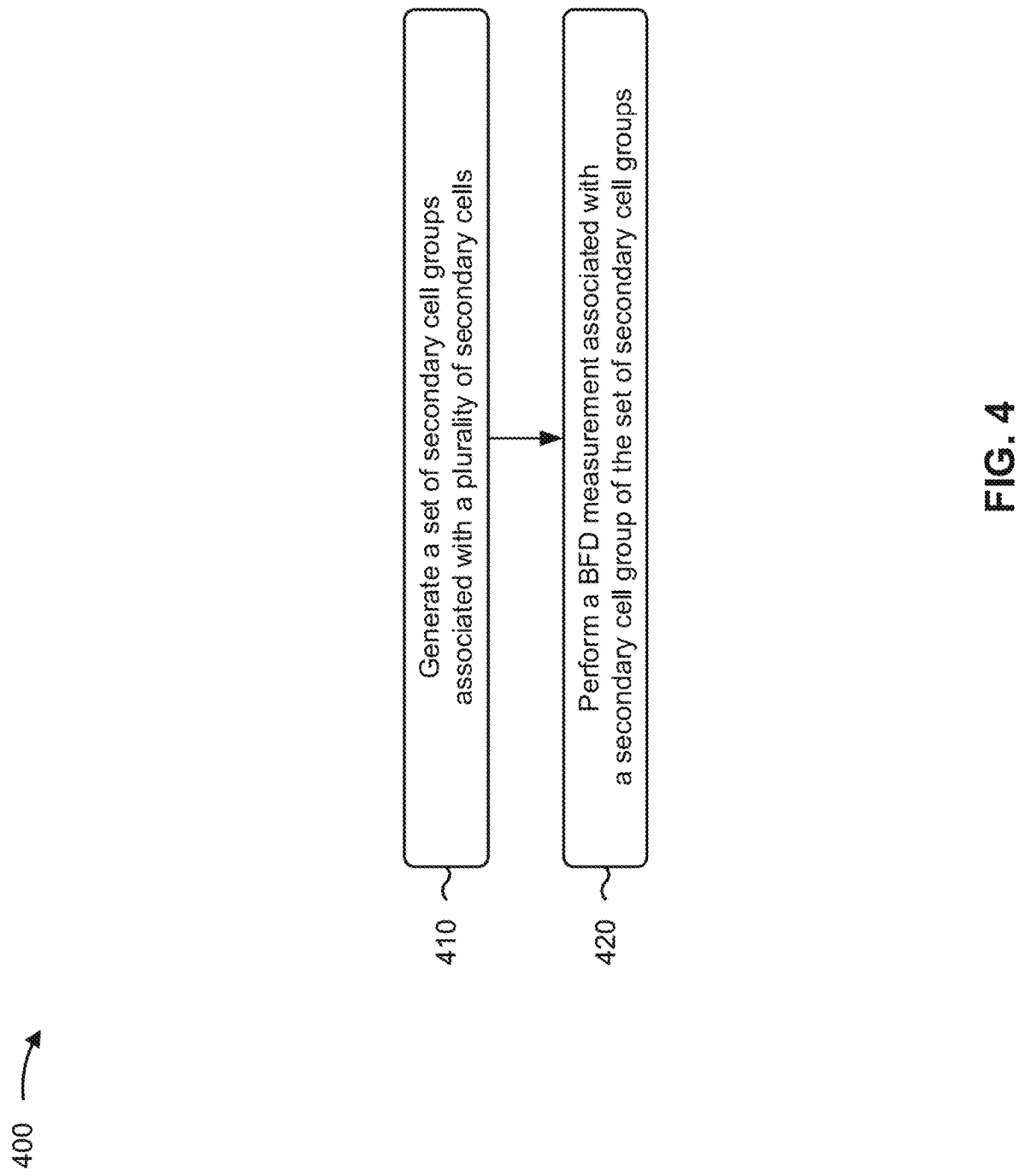
FIG. 4 is a diagram illustrating an example process performed, for example, by a user equipment, in accordance with the present disclosure.

FIG. 4 is a diagram illustrating an example process 400 performed, for example, by a UE, in accordance with the present disclosure. Example process 400 is an example where the UE (e.g., UE 120 and/or the like) performs operations associated with a secondary cell BFD evaluation period during inter-band carrier aggregation.

As shown in FIG. 4, in some aspects, process 400 may include generating a set of secondary cell groups associated with a plurality of secondary cells (block 410). For example, the UE (e.g., using receive processor 258, transmit processor 264, controller/processor 280, memory 282, and/or the like) may generate a set of secondary cell groups associated with a plurality of secondary cells, as described above. In some aspects, the plurality of secondary cells includes a set of inter-band secondary cells. In some aspects, the set of inter-band secondary cells is included in a first secondary cell group of the set of secondary cell groups.

As further shown in FIG. 4, in some aspects, process 400 may include performing a BFD measurement associated with a secondary cell group of the set of secondary cell groups (block 420). For example, the user equipment (e.g., using receive processor 258, transmit processor 264, controller/processor 280, memory 282, and/or the like) may perform a BFD measurement associated with a secondary cell group of the set of secondary cell groups, as described above.

Process 400 may include additional aspects, such as any single aspect or any combination of aspects described below and/or in connection with one or more other processes described elsewhere herein.

In a first aspect, process 400 includes identifying the set of inter-band secondary cells as having quasi co-located BFD reference signals, the first secondary cell group being generated based at least in part on identifying the set of inter-band secondary cells as having quasi co-located BFD reference signals.

In a second aspect, alone or in combination with the first aspect, the set of inter-band secondary cells is identified as having quasi co-located BFD reference signals based at least in part on information received via at least one of: radio resource control signaling, system information, a medium access control control element, or downlink control information.

In a third aspect, alone or in combination with one or more of the first and second aspects, the set of inter-band secondary cells is identified as having quasi co-located BFD reference signals based at least in part on a configuration of the UE.

In a fourth aspect, alone or in combination with one or more of the first through third aspects, the set of inter-band secondary cells is identified as having quasi co-located BFD reference signals based at least in part on information associated with the set of inter-band secondary cells.

In a fifth aspect, alone or in combination with one or more of the first through fourth aspects, the information associated with the set of inter-band secondary cells includes information associated with receive beams used by the set of inter-band secondary cells.

In a sixth aspect, alone or in combination with one or more of the first through fifth aspects, the set of inter-band secondary cells is identified as having quasi co-located BFD reference signals according to a UE implementation.

In a seventh aspect, alone or in combination with one or more of the first through sixth aspects, generating the set of secondary cell groups includes generating a second set of secondary cell group, of the set of secondary cell groups, including the at least two secondary cells, the second secondary cell group being generated based at least in part on identifying the at least two secondary cells as sharing the same reference signal as a BFD reference signal.

In an eighth aspect, alone or in combination with one or more of the first through seventh aspects, the plurality of secondary cells includes a plurality of activated secondary cells.

In a ninth aspect, alone or in combination with one or more of the first through eighth aspects, process 400 includes determining a scaling factor for a BFD evaluation period associated with the secondary cell group of the set of secondary cell groups, the scaling factor being determined based at least in part on a number of secondary cell groups included in the set of secondary cell groups. Here, the BFD measurement is performed based at least in part on the scaling factor for the BFD evaluation period.

In a tenth aspect, alone or in combination with one or more of the first through ninth aspects, the set of secondary cell groups includes a set of activated secondary cell groups.

In an eleventh aspect, alone or in combination with one or more of the first through tenth aspects, the set of secondary cell groups includes a set of configured secondary cell groups.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram illustrating an example process 500 performed, for example, by a UE, in accordance with the present disclosure. Example process 500 is an example where the UE (e.g., UE 120 and/or the like) performs operations associated with a secondary cell BFD evaluation period during inter-band carrier aggregation.

As shown in FIG. 5, in some aspects, process 500 may include determining a scaling factor for a BFD evaluation period associated with a secondary cell group of a set of secondary cell groups (block 510). For example, the UE (e.g., using receive processor 258, transmit processor 264, controller/processor 280, memory 282, and/or the like) may determine a scaling factor for a BFD evaluation period associated with a secondary cell group of a set of secondary cell groups, as described above. In some aspects, the scaling factor is determined based at least in part on a number of secondary cell groups included in the set of secondary cell groups As further shown in FIG. 5, in some aspects, process 500 may include performing a BFD measurement, associated with the secondary cell group, based at least in part on the scaling factor for the BFD evaluation period (block 520). For example, the UE (e.g., using receive processor 258, transmit processor 264, controller/processor 280, memory 282, and/or the like) may perform a BFD measurement, associated with the secondary cell group, based at least in part on the scaling factor for the BFD evaluation period, as described above.

Process 500 may include additional aspects, such as any single aspect or any combination of aspects described below and/or in connection with one or more other processes described elsewhere herein.

In a first aspect, the set of secondary cell groups includes a set of activated secondary cell groups.

In a second aspect, alone or in combination with the first aspect, the set of secondary cell groups includes a set of configured secondary cell groups.

In a third aspect, alone or in combination with one or more of the first and second aspects, the secondary cell group includes a set of inter-band secondary cells that the UE can receive with a common beam, and the BFD measurement is performed for an inter-band secondary cell included in the set of inter-band secondary cells.

In a fourth aspect, alone or in combination with one or more of the first through third aspects, the UE is not required to evaluate BFD for other inter-band secondary cells included in the secondary cell group.

In a fifth aspect, alone or in combination with one or more of the first through fourth aspects, process 500 includes determining an intra-secondary cell group scaling factor modification for the inter-band secondary cell, the BFD measurement being performed further based at least in part on the intra-secondary cell group scaling factor modification for the inter-band secondary cell.

In a sixth aspect, alone or in combination with one or more of the first through fifth aspects, the intra-secondary cell group scaling factor modification for the inter-band secondary cell is determined based at least in part on information received via at least one of: radio resource control signaling, system information, a medium access control control element, or downlink control information.

In a seventh aspect, alone or in combination with one or more of the first through sixth aspects, the intra-secondary cell group scaling factor modification for the inter-band secondary cell is determined based at least in part on a configuration of the UE.

In an eighth aspect, alone or in combination with one or more of the first through seventh aspects, the intra-secondary cell group scaling factor modification for the inter-band secondary cell is determined based at least in part on information associated with the set of inter-band secondary cells.

In a ninth aspect, alone or in combination with one or more of the first through eighth aspects, process 500 includes determining a frequency range scaling factor modification for the inter-band secondary cell, the BFD measurement being performed further based at least in part on the frequency range scaling factor modification for the inter-band secondary cell.

In a tenth aspect, alone or in combination with one or more of the first through ninth aspects, the frequency range scaling factor modification is for inter-band secondary cells included in FR1.

In an eleventh aspect, alone or in combination with one or more of the first through tenth aspects, the frequency range scaling factor modification is for inter-band secondary cells included in FR2.

In a twelfth aspect, alone or in combination with one or more of the first through eleventh aspects, the frequency range scaling factor modification for the inter-band secondary cell is determined based at least in part on information received via at least one of: radio resource control signaling, system information, a medium access control control element, or downlink control information.

In a thirteenth aspect, alone or in combination with one or more of the first through twelfth aspects, the frequency range scaling factor modification for the inter-band secondary cell is determined based at least in part on a configuration of the UE.

In a fourteenth aspect, alone or in combination with one or more of the first through thirteenth aspects, the frequency range scaling factor modification associated with the inter-band secondary cell is determined based at least in part on a frequency range of the inter-band secondary cell.

In a fifteenth aspect, alone or in combination with one or more of the first through fourteenth aspects, the frequency range scaling factor modification associated with the inter-band secondary cell is determined based at least in part on a priority of a frequency range of the inter-band secondary cell.

In a sixteenth aspect, alone or in combination with one or more of the first through fifteenth aspects, the priority of the frequency range is determined based at least in part on whether the frequency range of the inter-band secondary cell matches a frequency range of a primary cell.

In a seventeenth aspect, alone or in combination with one or more of the first through sixteenth aspects, the priority of the frequency range is determined to be a high priority when the frequency range of the inter-band secondary cell matches the frequency range of the primary cell.

In an eighteenth aspect, alone or in combination with one or more of the first through seventeenth aspects, the priority of the frequency range is determined to be a low priority when the frequency range of the inter-band secondary cell does not match the frequency range of the primary cell.

In a nineteenth aspect, alone or in combination with one or more of the first through eighteenth aspects, the priority of the frequency range is determined based at least in part on whether the frequency range of the inter-band secondary cell matches a frequency range of a PUCCH cell component carrier.

In a twentieth aspect, alone or in combination with one or more of the first through nineteenth aspects, the priority of the frequency range is determined to be a high priority when the frequency range of the inter-band secondary cell matches the frequency range of the PUCCH cell component carrier.

In a twenty first aspect, alone or in combination with one or more of the first through twentieth aspects, the priority of the frequency range is determined to be a low priority when the frequency range of the inter-band secondary cell does not match the frequency range of the PUCCH cell component carrier.

In a twenty second aspect, alone or in combination with one or more of the first through twenty first aspects, the priority of the frequency range is determined based at least in part on comparing a number of CORESET TCI states per component carrier for the frequency range and a number of CORESET TCI states per component carrier for another frequency range.

In a twenty third aspect, alone or in combination with one or more of the first through twenty second aspects, the priority of the frequency range is determined to be a high priority when the number of CORESET TCI states per component carrier for the frequency range is less than or equal to the number of CORESET TCI states per component carrier for the other frequency range.

In a twenty fourth aspect, alone or in combination with one or more of the first through twenty third aspects, the priority of the frequency range is determined to be a low priority when the number of CORESET TCI states per component carrier for the frequency range is greater than the number of CORESET TCI states per component carrier for the other frequency range.

In a twenty fifth aspect, alone or in combination with one or more of the first through twenty fourth aspects, the secondary cell group includes a single secondary cell, and the BFD measurement is performed for the secondary cell.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a user equipment (UE), comprising: generating a set of secondary cell groups associated with a plurality of secondary cells, the plurality of secondary cells including a set of inter-band secondary cells, the set of inter-band secondary cells being included in a first secondary cell group of the set of secondary cell groups; and performing a beam failure detection (BFD) measurement associated with a secondary cell group of the set of secondary cell groups.

Aspect 2: The method of Aspect 1, further comprising: identifying the set of inter-band secondary cells as having quasi co-located BFD reference signals, the first secondary cell group being generated based at least in part on identifying the set of inter-band secondary cells as having quasi co-located BFD reference signals.

Aspect 3: The method of Aspect 2, wherein the set of inter-band secondary cells is identified as having quasi co-located BFD reference signals based at least in part on information received via at least one of: radio resource control signaling, system information, a medium access control control element, or downlink control information.

Aspect 4: The method of any of Aspects 2-3, wherein the set of inter-band secondary cells is identified as having quasi co-located BFD reference signals based at least in part on a configuration of the UE.

Aspect 5: The method of any of Aspects 2-4, wherein the set of inter-band secondary cells is identified as having quasi co-located BFD reference signals based at least in part on information associated with the set of inter-band secondary cells.

Aspect 6: The method of Aspect 5, wherein the information associated with the set of inter-band secondary cells includes information associated with receive beams used by the set of inter-band secondary cells.

Aspect 7: The method of any of Aspects 5-6, wherein the set of inter-band secondary cells is identified as having quasi co-located BFD reference signals according to a UE implementation.

Aspect 8: The method of any of Aspects 1-7, further comprising: identifying at least two secondary cells, of the plurality of secondary cells, as sharing a same reference signal as a BFD reference signal; and wherein generating the set of secondary cell groups comprises: generating a second set of secondary cell group, of the set of secondary cell groups, including the at least two secondary cells, the second secondary cell group being generated based at least in part on identifying the at least two secondary cells as sharing the same reference signal as a BFD reference signal. wherein generating the set of secondary cell groups comprises: generating a second set of secondary cell group, of the set of secondary cell groups, including the at least two secondary cells, the second secondary cell group being generated based at least in part on identifying the at least two secondary cells as sharing the same reference signal as a BFD reference signal.

Aspect 9: The method of any of Aspects 1-8, wherein the plurality of secondary cells includes a plurality of activated secondary cells.

Aspect 10: The method of any of Aspects 1-9, further comprising: determining a scaling factor for a BFD evaluation period associated with the secondary cell group of the set of secondary cell groups, the scaling factor being determined based at least in part on a number of secondary cell groups included in the set of secondary cell groups; and the BFD measurement being performed based at least in part on the scaling factor for the BFD evaluation period.

Aspect 11: The method of Aspect 10, wherein the set of secondary cell groups includes a set of activated secondary cell groups.

Aspect 12: The method of any of Aspects 10-11, wherein the set of secondary cell groups includes a set of configured secondary cell groups.

Aspect 13: A method of wireless communication performed by a user equipment (UE), comprising: determining a scaling factor for a beam failure detection (BFD) evaluation period associated with a secondary cell group of a set of secondary cell groups, the scaling factor being determined based at least in part on a number of secondary cell groups included in the set of secondary cell groups; and performing a BFD measurement, associated with the secondary cell group, based at least in part on the scaling factor for the BFD evaluation period.

Aspect 14: The method of Aspect 13, wherein the set of secondary cell groups includes a set of activated secondary cell groups.

Aspect 15: The method of any of Aspects 13-14, wherein the set of secondary cell groups includes a set of configured secondary cell groups.

Aspect 16: The method of any of Aspects 13-15, wherein the secondary cell group includes a set of inter-band secondary cells that the UE can receive with a common beam, and the BFD measurement is performed for an inter-band secondary cell included in the set of inter-band secondary cells.

Aspect 17: The method of Aspect 16, where UE is not required to evaluate BFD for other inter-band secondary cells included in the secondary cell group.

Aspect 18: The method of any of Aspects 16-17, further comprising: determining an intra-secondary cell group scaling factor modification for the inter-band secondary cell, the BFD measurement being performed further based at least in part on the intra-secondary cell group scaling factor modification for the inter-band secondary cell.

Aspect 19: The method of Aspect 18, wherein the intra-secondary cell group scaling factor modification for the inter-band secondary cell is determined based at least in part on information received via at least one of: radio resource control signaling, system information, a medium access control control element, or downlink control information.

Aspect 20: The method of any of Aspects 18-19, wherein the intra-secondary cell group scaling factor modification for the inter-band secondary cell is determined based at least in part on a configuration of the UE.

Aspect 21: The method of any of Aspects 18-20, wherein the intra-secondary cell group scaling factor modification for the inter-band secondary cell is determined based at least in part on information associated with the set of inter-band secondary cells.

Aspect 22: The method of any of Aspects 16-21, further comprising: determining a frequency range scaling factor modification for the inter-band secondary cell, the BFD measurement being performed further based at least in part on the frequency range scaling factor modification for the inter-band secondary cell.

Aspect 23: The method of Aspect 22, wherein the frequency range scaling factor modification is for inter-band secondary cells included in frequency range 1 (FR1).

Aspect 24: The method of Aspect 22, wherein the frequency range scaling factor modification is for inter-band secondary cells included in frequency range 2 (FR2).

Aspect 25: The method of any of Aspects 22-24, wherein the frequency range scaling factor modification for the inter-band secondary cell is determined based at least in part on information received via at least one of: radio resource control signaling, system information, a medium access control control element, or downlink control information.

Aspect 26: The method of any of Aspects 22-25, wherein the frequency range scaling factor modification for the inter-band secondary cell is determined based at least in part on a configuration of the UE.

Aspect 27: The method of any of Aspects 22-26, wherein the frequency range scaling factor modification associated with the inter-band secondary cell is determined based at least in part on a frequency range of the inter-band secondary cell.

Aspect 28: The method of any of Aspects 22-27, wherein the frequency range scaling factor modification associated with the inter-band secondary cell is determined based at least in part on a priority of a frequency range of the inter-band secondary cell.

Aspect 29: The method of Aspect 28, wherein the priority of the frequency range is determined based at least in part on whether the frequency range of the inter-band secondary cell matches a frequency range of a primary cell.

Aspect 30: The method of Aspect 29, wherein the priority of the frequency range is determined to be a high priority when the frequency range of the inter-band secondary cell matches the frequency range of the primary cell.

Aspect 31: The method of Aspect 29, wherein the priority of the frequency range is determined to be a low priority when the frequency range of the inter-band secondary cell does not match the frequency range of the primary cell.

Aspect 32: The method of any of Aspects 28-31, wherein the priority of the frequency range is determined based at least in part on whether the frequency range of the inter-band secondary cell matches a frequency range of a physical uplink control channel (PUCCH) cell component carrier.

Aspect 33: The method of Aspect 32, wherein the priority of the frequency range is determined to be a high priority when the frequency range of the inter-band secondary cell matches the frequency range of the PUCCH cell component carrier.

Aspect 34: The method of Aspect 32, wherein the priority of the frequency range is determined to be a low priority when the frequency range of the inter-band secondary cell does not match the frequency range of the PUCCH cell component carrier.

Aspect 35: The method of any of Aspects 28-34, wherein the priority of the frequency range is determined based at least in part on comparing a number of control resource set (CORESET) transmission configuration indicator (TCI) states per component carrier for the frequency range and a number of CORESET TCI states per component carrier for another frequency range.

Aspect 36: The method of Aspect 35, wherein the priority of the frequency range is determined to be a high priority when the number of CORESET TCI states per component carrier for the frequency range is less than or equal to the number of CORESET TCI states per component carrier for the other frequency range.

Aspect 37: The method of Aspect 35, wherein the priority of the frequency range is determined to be a low priority when the number of CORESET TCI states per component carrier for the frequency range is greater than the number of CORESET TCI states per component carrier for the other frequency range.

Aspect 38: The method of any of Aspects 13-37, wherein the secondary cell group includes a single secondary cell, and the BFD measurement is performed for the secondary cell.

Aspect 39: An apparatus for wireless communication at a device, comprising a processor; memory coupled with the processor; and instructions stored in the memory and executable by the processor to cause the apparatus to perform the method of one or more of Aspects 1-12.

Aspect 40: A device for wireless communication, comprising a memory and one or more processors coupled to the memory, the memory and the one or more processors configured to perform the method of one or more of Aspects 1-12.

Aspect 41: An apparatus for wireless communication, comprising at least one means for performing the method of one or more of Aspects 1-12.

Aspect 42: A non-transitory computer-readable medium storing code for wireless communication, the code comprising instructions executable by a processor to perform the method of one or more of Aspects 1-12.

Aspect 43: A non-transitory computer-readable medium storing a set of instructions for wireless communication, the set of instructions comprising one or more instructions that, when executed by one or more processors of a device, cause the device to perform the method of one or more of Aspects 1-12.

Aspect 44: An apparatus for wireless communication at a device, comprising a processor; memory coupled with the processor; and instructions stored in the memory and executable by the processor to cause the apparatus to perform the method of one or more of Aspects 13-38.

Aspect 45: A device for wireless communication, comprising a memory and one or more processors coupled to the memory, the memory and the one or more processors configured to perform the method of one or more of Aspects 13-38.

Aspect 46: An apparatus for wireless communication, comprising at least one means for performing the method of one or more of Aspects 13-38.

Aspect 47: A non-transitory computer-readable medium storing code for wireless communication, the code comprising instructions executable by a processor to perform the method of one or more of Aspects 13-38.

Aspect 48: A non-transitory computer-readable medium storing a set of instructions for wireless communication, the set of instructions comprising one or more instructions that, when executed by one or more processors of a device, cause the device to perform the method of one or more of Aspects 13-38.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
 determining a scaling factor for a beam failure detection (BFD) evaluation period associated with a set of inter-band secondary cells that the UE can receive with a common beam,
  the scaling factor being determined based at least in part on a number of sets of inter-band secondary cells; and
 performing a BFD measurement, for an inter-band secondary cell included in the set of inter-band secondary cells, based at least in part on the scaling factor for the BFD evaluation period.

2. The method of claim 1, wherein a set of secondary cell groups includes a secondary cell group that includes the set of inter-band secondary cells, and the set of secondary cell groups includes a set of activated secondary cell groups.

3. The method of claim 1, wherein a set of secondary cell groups includes a secondary cell group that includes the set of inter-band secondary cells, and the set of secondary cell groups includes a set of configured secondary cell groups.

4. The method of claim 1, wherein a set of secondary cell groups includes a secondary cell group that includes the set of inter-band secondary cells, and the UE is not required to evaluate BFD for other inter-band secondary cells included in the secondary cell group.

5. The method of claim 1, further comprising:
 determining an intra-secondary cell group scaling factor modification for the inter-band secondary cell,
  the BFD measurement being performed further based at least in part on the intra-secondary cell group scaling factor modification for the inter-band secondary cell.

6. The method of claim 5, wherein the intra-secondary cell group scaling factor modification for the inter-band secondary cell is determined based at least in part on information received via at least one of:
 radio resource control signaling,
 system information,
 a medium access control control element, or
 downlink control information.

7. The method of claim 5, wherein the intra-secondary cell group scaling factor modification for the inter-band secondary cell is determined based at least in part on a configuration of the UE.

8. The method of claim 5, wherein the intra-secondary cell group scaling factor modification for the inter-band secondary cell is determined based at least in part on information associated with the set of inter-band secondary cells.

9. The method of claim 1, further comprising:
 determining a frequency range scaling factor modification for the inter-band secondary cell,
  the BFD measurement being performed further based at least in part on the frequency range scaling factor modification for the inter-band secondary cell.

10. The method of claim 9, wherein the frequency range scaling factor modification is for inter-band secondary cells included in frequency range 1 (FR1).

11. The method of claim 9, wherein the frequency range scaling factor modification is for inter-band secondary cells included in frequency range 2 (FR2).

12. The method of claim 9, wherein the frequency range scaling factor modification for the inter-band secondary cell is determined based at least in part on information received via at least one of:
 radio resource control signaling,
 system information,
 a medium access control control element, or
 downlink control information.

13. The method of claim 9, wherein the frequency range scaling factor modification for the inter-band secondary cell is determined based at least in part on a configuration of the UE.

14. The method of claim 9, wherein the frequency range scaling factor modification associated with the inter-band secondary cell is determined based at least in part on a frequency range of the inter-band secondary cell.

15. The method of claim 9, wherein the frequency range scaling factor modification associated with the inter-band secondary cell is determined based at least in part on a priority of a frequency range of the inter-band secondary cell.

16. The method of claim 15, wherein the priority of the frequency range is determined based at least in part on whether the frequency range of the inter-band secondary cell matches a frequency range of a primary cell.

17. The method of claim 16, wherein the priority of the frequency range is determined to be a high priority when the frequency range of the inter-band secondary cell matches the frequency range of the primary cell.

18. The method of claim 16, wherein the priority of the frequency range is determined to be a low priority when the frequency range of the inter-band secondary cell does not match the frequency range of the primary cell.

19. The method of claim 15, wherein the priority of the frequency range is determined based at least in part on whether the frequency range of the inter-band secondary cell matches a frequency range of a physical uplink control channel (PUCCH) cell component carrier.

20. The method of claim 19, wherein the priority of the frequency range is determined to be a high priority when the frequency range of the inter-band secondary cell matches the frequency range of the PUCCH cell component carrier.

21. The method of claim 19, wherein the priority of the frequency range is determined to be a low priority when the frequency range of the inter-band secondary cell does not match the frequency range of the PUCCH cell component carrier.

22. The method of claim 15, wherein the priority of the frequency range is determined based at least in part on comparing a number of control resource set (CORESET) transmission configuration indicator (TCI) states per component carrier for the frequency range and a number of CORESET TCI states per component carrier for another frequency range.

23. The method of claim 22, wherein the priority of the frequency range is determined to be a high priority when the number of CORESET TCI states per component carrier for the frequency range is less than or equal to the number of CORESET TCI states per component carrier for the other frequency range.

24. The method of claim 22, wherein the priority of the frequency range is determined to be a low priority when the number of CORESET TCI states per component carrier for the frequency range is greater than the number of CORESET TCI states per component carrier for the other frequency range.

25. A user equipment (UE) for wireless communication, comprising:
a memory; and
one or more processors coupled to the memory, the one or more processors configured to:
determine a scaling factor for a beam failure detection (BFD) evaluation period associated with a set of inter-band secondary cells that the UE can receive with a common beam,
the scaling factor being determined based at least in part on a number of sets of inter-band secondary cells; and
perform a BFD measurement, for an inter-band secondary cell included in the set of inter-band secondary cells, based at least in part on the scaling factor for the BFD evaluation period.

26. The UE of claim 25, wherein a set of secondary cell groups includes a secondary cell group that includes the set of inter-band secondary cells, and the UE is not required to evaluate BFD for other inter-band secondary cells included in the secondary cell group.

27. The UE of claim 25, wherein the one or more processors are further configured to:
determine an intra-secondary cell group scaling factor modification for the inter-band secondary cell,
the BFD measurement being performed further based at least in part on the intra-secondary cell group scaling factor modification for the inter-band secondary cell.

28. A non-transitory computer-readable medium storing one or more instructions for wireless communication, the one or more instructions comprising:
one or more instructions that, when executed by one or more processors of a user equipment (UE), cause the one or more processors to:
determine a scaling factor for a beam failure detection (BFD) evaluation period associated with a set of inter-band secondary cells that the UE can receive with a common beam,
the scaling factor being determined based at least in part on a number of sets of inter-band secondary cells; and
perform a BFD measurement, for an inter-band secondary cell included in the set of inter-band secondary cells, based at least in part on the scaling factor for the BFD evaluation period.

29. An apparatus for wireless communication, comprising:
means for determining a scaling factor for a beam failure detection (BFD) evaluation period associated with a set of inter-band secondary cells that the apparatus can receive with a common beam,
the scaling factor being determined based at least in part on a number of sets of inter-band secondary cells; and
means for performing a BFD measurement, for an inter-band secondary cell included in the set of inter-band secondary cells, based at least in part on the scaling factor for the BFD evaluation period.

\* \* \* \* \*